(12) United States Patent
Sasaki et al.

(10) Patent No.: US 11,051,451 B2
(45) Date of Patent: Jul. 6, 2021

(54) CUTTING BLADE REPLACEMENT JIG AND METHOD

(71) Applicant: Honda Motor Co., Ltd., Tokyo (JP)

(72) Inventors: Hideshi Sasaki, Wako (JP); Koji Kasai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 97 days.

(21) Appl. No.: 15/604,323

(22) Filed: May 24, 2017

(65) Prior Publication Data

US 2017/0367260 A1 Dec. 28, 2017

(30) Foreign Application Priority Data

Jun. 23, 2016 (JP) .............................. JP2016-124640

(51) Int. Cl.
*A01D 34/73* (2006.01)
*B23P 6/00* (2006.01)

(52) U.S. Cl.
CPC ......... *A01D 34/733* (2013.01); *A01D 34/736* (2013.01); *B23P 6/00* (2013.01)

(58) Field of Classification Search
CPC ........ A01D 34/733; A01D 34/736; B23P 6/00
See application file for complete search history.

(56) References Cited

U.S. PATENT DOCUMENTS

| 6,272,724 | B1 * | 8/2001 | Sterling | ............... | A01D 34/001 |
| | | | | | 29/281.1 |
| 7,490,459 | B2 * | 2/2009 | Thompson | ........... | A01D 34/733 |
| | | | | | 29/402.03 |
| 2001/0035077 | A1 * | 11/2001 | Adams | .................... | B25B 13/04 |
| | | | | | 81/180.1 |
| 2001/0035080 | A1 * | 11/2001 | Adams | ..................... | B25B 9/00 |
| | | | | | 81/488 |
| 2005/0138913 | A1 | 6/2005 | Thompson et al. | | |

FOREIGN PATENT DOCUMENTS

JP 2008054568 A 3/2008

* cited by examiner

*Primary Examiner* — David P Bryant
*Assistant Examiner* — Nirvana Deonauth
(74) *Attorney, Agent, or Firm* — Duft & Bornsen, PC

(57) ABSTRACT

A cutting blade replacement jig for replacing a cutting blade of a utility unit, the cutting blade being attached to a peripheral edge part of a disk by a first fastening member and a second fastening member fastened to the first fastening member, the first fastening member passing through a disk through hole formed in the peripheral edge part and a cutting blade through hole formed in the cutting blade. The cutting blade replacement jig includes: a fastening member holder configured to hold the second fastening member; and a cutting blade holder configured to hold the cutting blade on the second fasting member held in the fastening member holder in a state where a center line of the cutting blade through hole and a center line of the second fasting member are aligned.

20 Claims, 11 Drawing Sheets

CUTTING BLADE REPLACEMENT JIG AND METHOD

CROSS-REFERENCE TO RELATED APPLICATION

This application is based upon and claims the benefit of priority from Japanese Patent Application No. 2016-124640 filed on Jun. 23, 2016, the content of which is incorporated herein by reference.

BACKGROUND OF THE INVENTION

Field of the Invention

This invention relates to a cutting blade replacement jig and a cutting blade replacement method for replacing a cutting blade of a utility unit such as lawn mowers and brush cutters.

Description of the Related Art

Conventionally, there are known cutting blade replacement jigs (cutting blade replacement tools) used to attach a cutting blade to a blade mounting plate of a lawn mower and to detach the cutting blade from the blade mounting plate. For example, Japanese Unexamined Patent Publication No. 2008-054568 (JP2008-054568A) describes a jig including a cutting blade socket formed with a bolt guide groove adapted to guide a cutting blade mounting bolt, wherein a cutting blade and an end portion of a cutting blade mounting plate are fitted into the bolt guide groove to prevent rotation of the cutting blade relative to the cutting blade mounting plate, and in the state, the cutting blade is attached and detached by operating a nut.

However, in order to use the jig described in JP2008-054568A, it is in advance necessary to position the cutting blade with respect to the cutting blade mounting plate, insert a bolt into a through hole of the cutting blade mounting plate and the cutting blade from below, and screw the nut onto the end of the bolt. Therefore, it takes time to attach and detach the cutting blade, and it is hard to efficiently replace the cutting blade.

SUMMARY OF THE INVENTION

An aspect of the present invention is a cutting blade replacement jig for replacing a cutting blade of a utility unit, the cutting blade being attached to a peripheral edge part of a disk by a first fastening member and a second fastening member fastened to the first fastening member, the first fastening member passing through a disk through hole formed in the peripheral edge part of the disk and a cutting blade through hole formed in the cutting blade. The cutting blade replacement jig includes a fastening member holder configured to hold the second fastening member; and a cutting blade holder configured to hold the cutting blade on the second fasting member held in the fastening member holder in a state where a center line of the cutting blade through hole and a center line of the second fasting member are aligned.

Another aspect of the present invention is a cutting blade replacement method for replacing a cutting blade of a utility unit, the cutting blade being attached to a peripheral edge part of a disk by a first fastening member and a second fastening member fastened to the first fastening member, the first fastening member passing through a disk through hole formed in the peripheral edge part of the disk and a cutting blade through hole formed in the cutting blade. The cutting blade replacement method includes: holding the second fastening member and the cutting blade in a cutting blade replacement jig, in a state of aligning a center line of the second fasting member and a center line of the cutting blade through hole in advance; placing the cutting blade replacement jig at the peripheral edge part of the disk so that the center line of the cutting blade through hole aligns with a center line of the disk through hole; and attaching the cutting blade to the disk by making the first fastening member pass through the disk through hole of the cutting blade held in the cutting blade replacement jig placed at peripheral edge part of the disk and the cutting blade through hole and by screwing the first fastening member to the second fastening member.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 15B. Although a cutting blade replacement jig according to an embodiment to the present invention can be used to replace cutting blades of various types of utility units, the following explanation is focused particularly on an example of use for replacing (exchanging) a cutting blade of a lawn mower.

Figure 1:
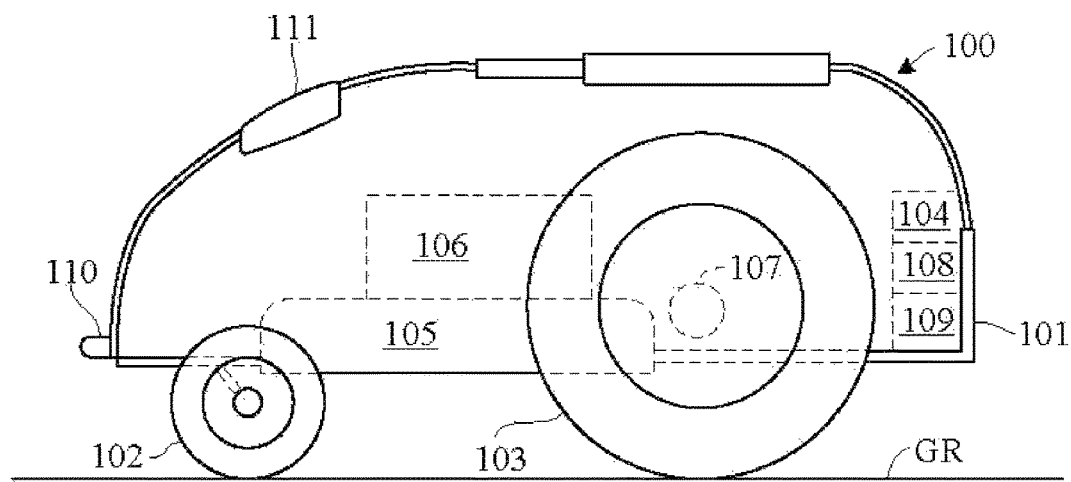
FIG. 1 is a side view showing schematically a configuration of a lawn mower on which a cutting blade replacement jig according to an embodiment of the present invention is utilized.

The structure of the lawn mower will be explained first. The lawn mower related to this embodiment of the present invention is configured as a mobile lawn mower that performs lawn mowing work while navigating autonomously. FIG. 1 is a side view showing schematically a configuration of a lawn mower 100 on which the cutting blade replacement jig according to the embodiment of the present invention is utilized, and FIG. 2 is a perspective view of the lawn mower 100 seen obliquely from below.

Figure 2:
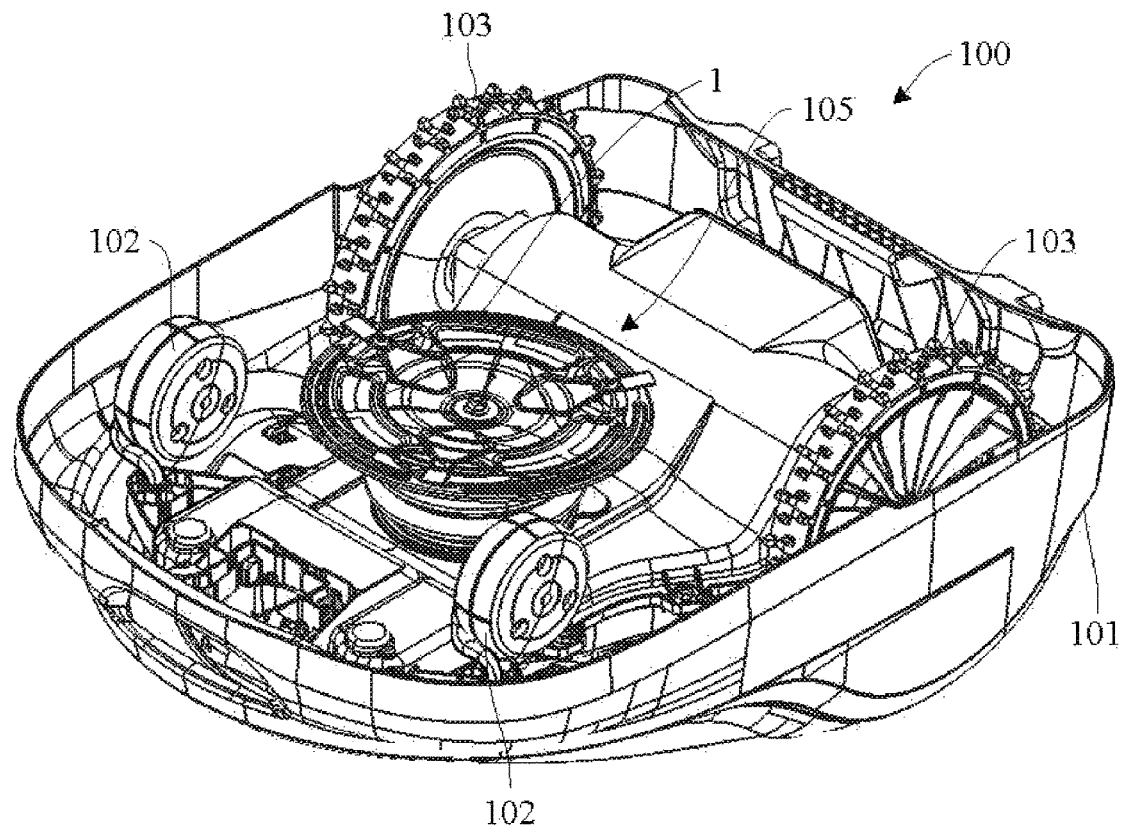
FIG. 2 is a perspective view of the lawn mower of FIG. 1 seen obliquely from below.

As shown in FIGS. 1 and 2, the lawn mower 100 is equipped with a body 101 having a chassis and a frame, along with left and right front wheels 102 and left and right rear wheels 103 that support the body 101 above a ground surface GR so as to be capable of moving. An ECU 104, a work unit 105, a work actuator 106 for driving the work unit, movement actuators 107 for driving the rear wheels, a charging unit 108, and a battery 109 are installed in an interior space of the lawn mower 100 enclosed by the chassis and frame. The ECU 104 is configured so as to include an arithmetic processing unit having, inter alia, a CPU, ROM, RAM and other peripheral circuits. The work actuator 106 and movement actuators 107 are constituted as electric motors, for example.

Output shafts of the movement actuators 107 are connected to rotating shafts of the left and right rear wheels 103, respectively, so that the movement actuators 107 independently drive (rotate) the left and right rear wheels 103. By establishing a difference between the rotating speeds of the left and right rear wheels 103, the lawn mower 100 can be turned to an arbitrary direction.

The charging unit 108 is connected by wires to terminals 110 provided at the front end of the frame and is also connected by wires to the battery 109. The battery 109 is charged by connecting the terminals 110 through contacts to a charging station 200 (see FIG. 3). The battery 109 is connected through wires to the work actuator 106 and the movement actuators 107, and the actuators 106 and 107 are driven by power supplied from the battery 109. Two magnetic sensors 111 are installed laterally spaced apart on the front end of the lawn mower 100. The magnetic sensors 111 output signals indicating magnetic field magnitude (magnetic field strength).

Although not illustrated in the drawing, the lawn mower 100 is further equipped with, inter alia, a Yaw sensor, a G sensor, a direction sensor, a contact sensor, wheel speed sensors, and a voltage sensor. The Yaw sensor outputs a signal indicating angular velocity (yaw rate) occurring around a height direction (z-axis) of the lawn mower 100. The G sensor outputs a signal indicating acceleration acting on the lawn mower 100 in the directions of three orthogonal axes (x-axis, y-axis, and z-axis). The direction sensor (geomagnetic field sensor) outputs a signal related to terrestrial magnetism. The contact sensor outputs an ON signal when the lawn mower 100 approaches or makes contact with an obstacle or the like. The wheel speed sensors output signals indicating the wheel speeds of the left and right rear wheels 103. The voltage sensor outputs a signal indicating residual voltage of the battery 109.

Figure 3:
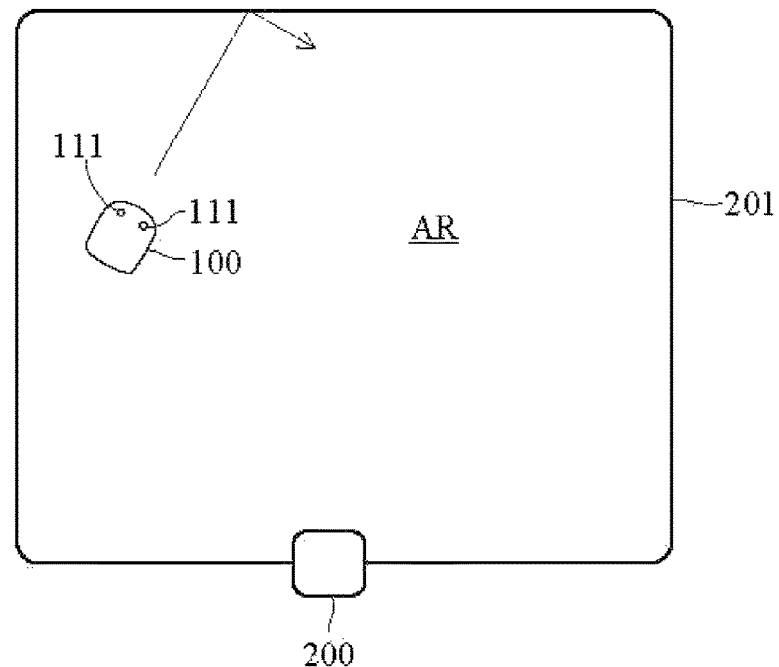
FIG. 3 is a plan view showing an example of a working area for the lawn mower of FIG. 1.

The lawn mower 100 configured as set out above performs a lawn mowing work while autonomously navigating within a predefined working area. FIG. 3 is a plan view showing an example of a working area AR. The working area AR is delineated by a boundary wire 201 laid beforehand (e.g., buried a predetermined depth under the ground surface GR) in a garden (yard), for example, and the boundary wire 201 defines a movement range of the lawn mower 100. A magnetic field is generated in the working area AR by passing electric current through the boundary wire 201. Magnetic field strength in the working area AR is detected by a pair of left and right magnetic sensors 111.

Magnetic field strength varies with distance from the boundary wire 201. The ECU 104 uses signals from the magnetic sensors 111 to determine whether the lawn mower 100 arrived at the boundary wire 201. When arrival at the boundary wire 201 is determined, control signals are output to the movement actuators 107 to turn the lawn mower 100 toward the inside of the working area AR as indicated by an arrow in FIG. 3. In this manner, the ECU 104 outputs control signals to the movement actuators 107 in accordance with signals from the magnetic sensors 111, whereby the lawn mower 100 navigates autonomously inside the working area AR. At this time, the ECU 104 also outputs a control signal to the work actuator 106 in order to perform a lawn mowing work inside the working area AR.

The charging station 200 for charging the battery 109 is installed above the boundary wire 201. When the voltage sensor detects that voltage of the battery 109 is too low during work, the ECU 104 outputs control signals to the movement actuators 107 so as to return the lawn mower 100 to the charging station 200, along the boundary wire 201, for example, and then charge the battery 109. When charging of the battery 109 is finished, the ECU 104 outputs control signals to the movement actuators 107 so as to separate the lawn mower 100 from the charging station 200 and thereafter drives the work actuator 106 to resume work. The ECU 104 also returns the lawn mower 100 to the charging station 200 upon work completion and keeps it standing by at the charging station 200 until the next work is started.

Figure 4:
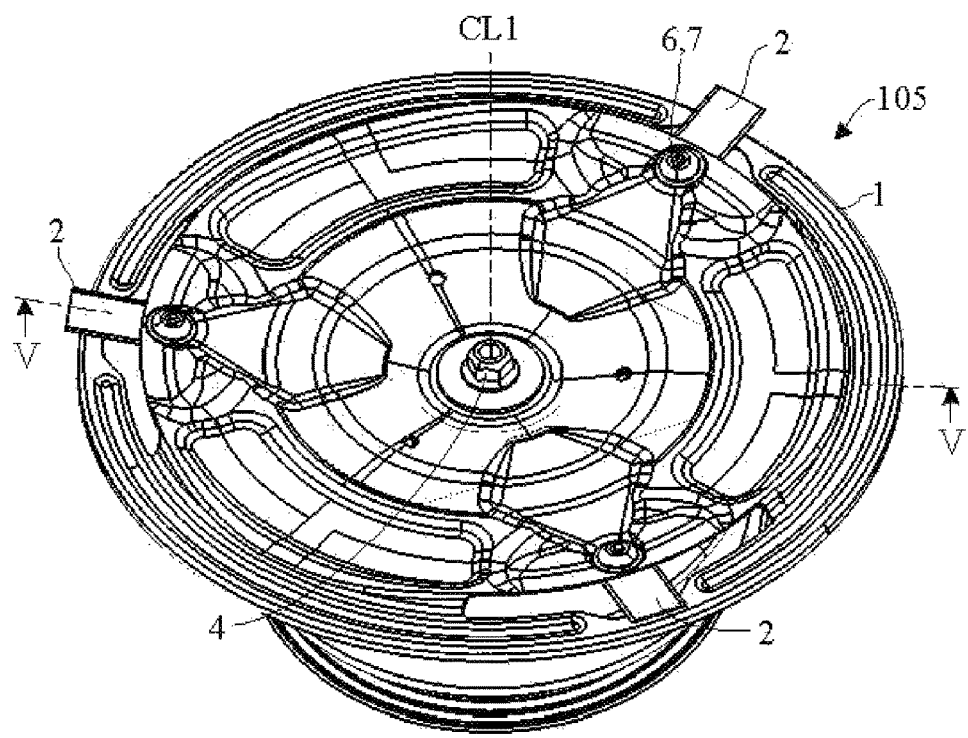
FIG. 4 is an enlarged view of part of FIG. 2.

A detailed explanation of the structure of the work unit 105 follows. FIG. 4 is enlarged view of a main part of FIG. 2. As shown in FIG. 4, the work unit 105 has a substantially circular disk 1 rotatable around a vertical axis CL1 and a plurality (three in the drawing) of blades for mowing lawn (cutting blades) 2 attached to the peripheral edge of the disk 1. The blades 2 are fastened to the peripheral edge of the disk 1 by bolts 6 and nuts 7 so as to be replaceable (see FIG. 8).

Figure 5:
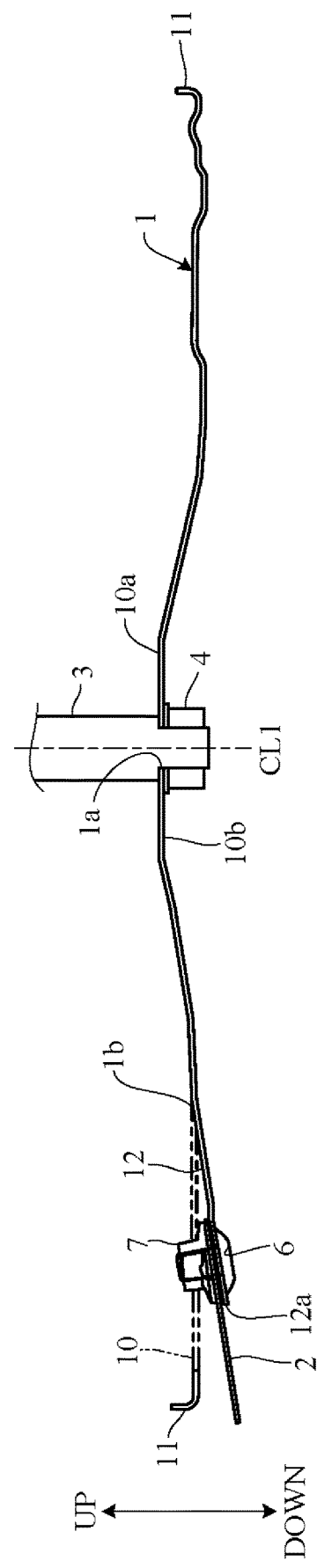
FIG. 5 is a cross-sectional view taken along line V-V of FIG. 4.
Figure 6:
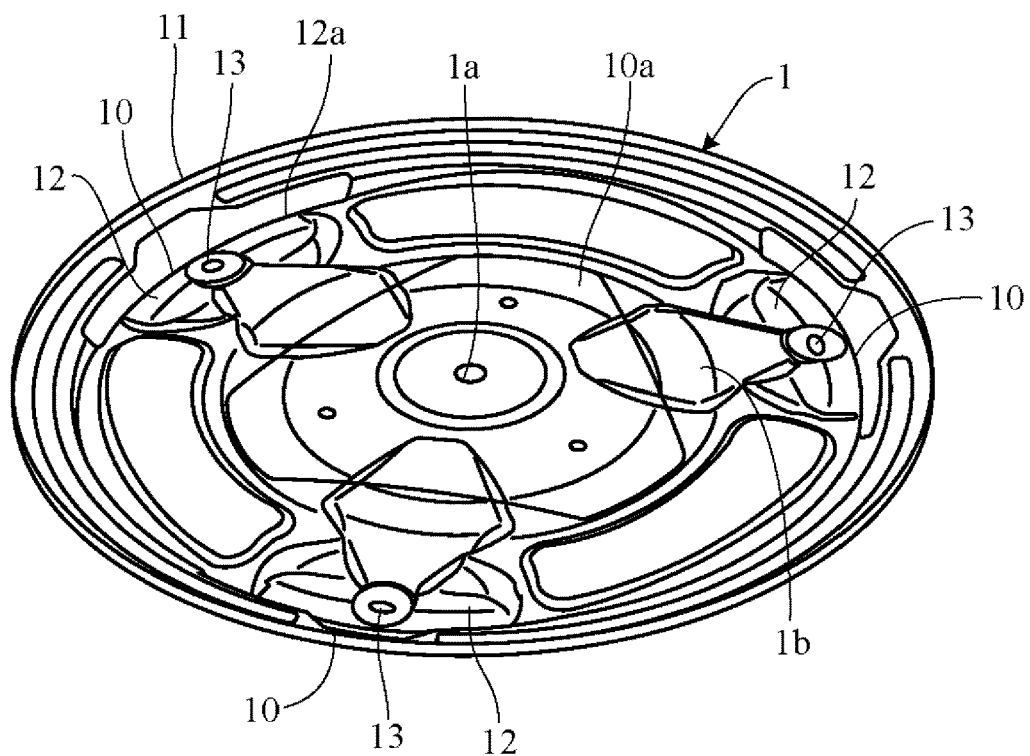
FIG. 6 is a perspective view of a disk of FIG. 5.

FIG. 5 is a cross-sectional view taken along line V-V of FIG. 4, and FIG. 6 is a perspective view of the disk 1. In FIG. 5, the up-down direction of the lawn mower 100 in the working is indicated by an arrow. As shown in FIGS. 5 and 6, the disk 1 has a top surface 10a located above and a bottom surface 10b located below in the gravity direction when the lawn mower 100 is working, and a through-hole 1a opens at a center region of the disk 1. One end of a rotating shaft 3 extending along the axis CL1 is inserted into the through-hole 1a, and the disk 1 is secured on the rotating shaft 3 by screwing a nut 4 onto the one end of the rotating shaft 3. The rotating shaft 3 is connected to the work actuator 106 (FIG. 1) at another end and rotates the disk 1 around the axis CL1 integrally with the blades 2 when driven by the work actuator 106.

A substantially ring-shaped flange 11 is formed to project upward from around the whole periphery of the disk 1. Arcuate cutouts 10 are formed radially inward of the flange 11 at three locations equally spaced in the circumferential direction. Radially inward of the cutouts 10, sloped portions 12 sloping away from the flange 11 (downward) are formed from predetermined radial locations 1b to the radially outward cutouts 10. Outer peripheral surfaces 12a of the sloped portions 12 are formed in arcuate shape centered on the axis CL1 (FIG. 5).

Figure 7:
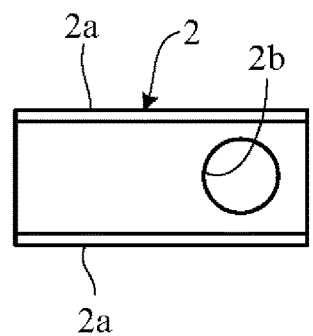
FIG. 7 is a plan view of a blade of FIG. 5.

FIG. 7 is a plan view of a single blade 2. As shown in FIG. 7, the blade 2 has the overall shape of a substantially rectangular flat plate formed with blade edges 2a on opposite longitudinal side faces. A round through-hole 2b for attaching the blade 2 is formed near one end of the blade.

Figure 8:
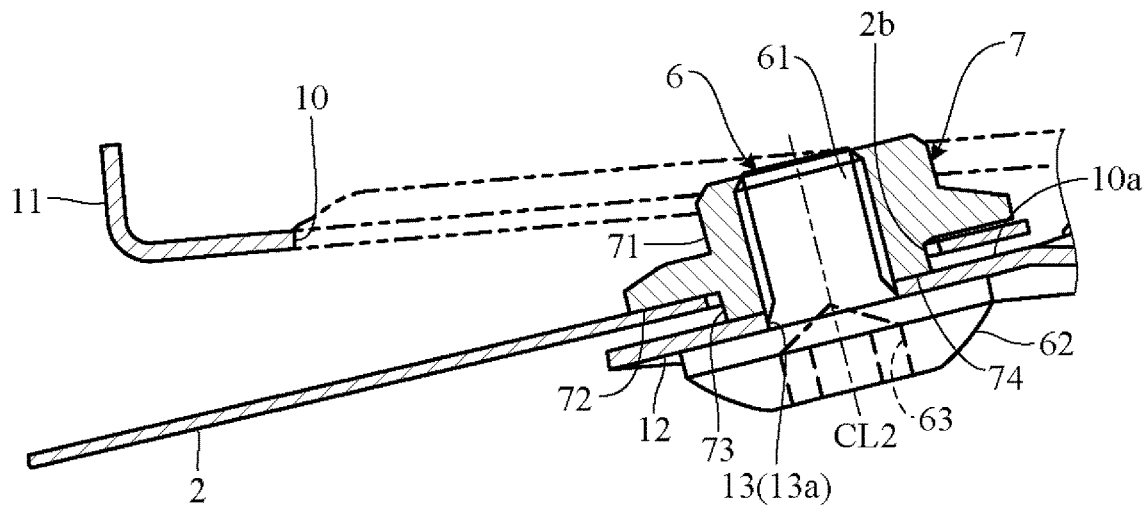
FIG. 8 is an enlarged view of part of FIG. 5.
Figure 9:
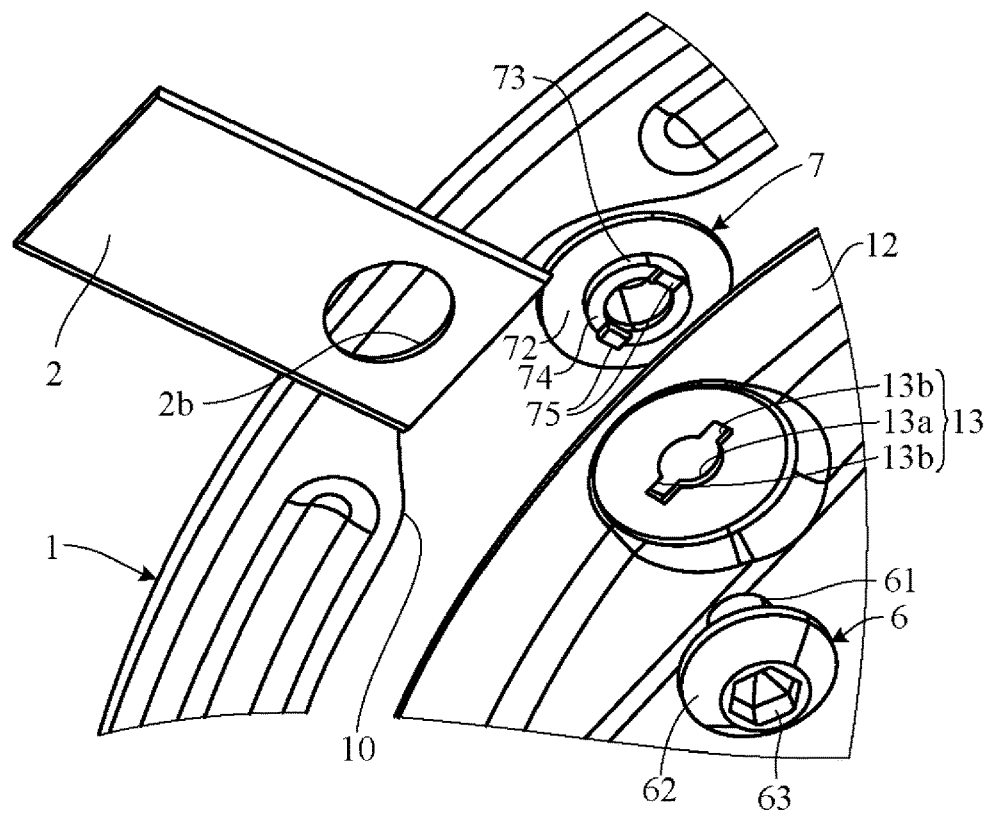
FIG. 9 is an exploded perspective view of part of FIG. 5.

FIG. 8 is an enlarged view of a main part of FIG. 5, and FIG. 9 is an exploded perspective view thereof. As seen in FIGS. 8 and 9, a through-hole 13 is formed in each sloped portion 12 of disk 1. The through-hole 13 has circular hole portion 13a centered on an axis (center line) CL2 and a pair of notches 13b of predetermined width extending in radially opposite directions from the axis CL2 at the center (in circumferential direction around the axis CL1). Diameter of the through-hole 2b of the blade 2 is larger than diameter of the hole portion 13a. A threaded portion 61 of the bolt 6 is inserted into the hole portion 13a.

The threaded portion 61 passes through the through-hole 2b of the blade 2 placed on the top surface 10a of the sloped portion 12 of the disk 1 and screw-engages the nut 7. The bolt 6 is a hexagon socket head bolt, whose head 62 is provided with a hexagonal socket 63 for inserting a tool. One surface of the head 62 (surface on opposite side from flange surface abutting the disk 1) is formed to slant at an angle toward the flange surface along its radial outer side. This minimizes projection of the head 62 of the bolt 6 and smoothens the surface of the head 62.

The nut 7 has a head 71, a substantially circular flange 72 provided on the bottom of the head 71, and a cylindrical portion 73 projecting downward from a bottom surface of the flange 72. Two projections 75 corresponding to the notches 13b of the through-hole 13 of the disk 1 protrude from an end surface 74 of the cylindrical portion 73. In a fastened state of the bolt 6 and the nut 7, the cylindrical portion 73 passes through the through-hole 2b of the blade 2 and its end surface 74 abuts the top surface 10a of the sloped portion 12 of the disk 1, so that the sloped portion 12 is clamped between the bolt 6 and the nut 7. At this time, the projections 75 of the nut 7 fit into the notches 13b, thereby restricting the position of the nut 7 with respect to the disk 1 and preventing rotation of the nut 7.

The blade 2 is situated between the flange 72 of the nut 7 and the sloped portion 12 of the disk 1. Diameter of the through-hole 2b of the blade 2 is larger than diameter of the cylindrical portion 73 and thickness of the blade 2 is thinner than length of the cylindrical portion 73. Therefore, the blade 2 can rotate around cylindrical portion 73 centered on the axis CL2 when the bolt 6 and nut 7 are fastened.

All of the three blades 2 are attached to the disk 1 by the bolts 6 and the nuts 7 in this manner. In the present embodiment, the cutting blade replacement jig described in the following makes attachment and detachment of the blades 2 simple, so that the work of replacing (exchanging) the blades 2 can be carried out with ease.

Figure 10:
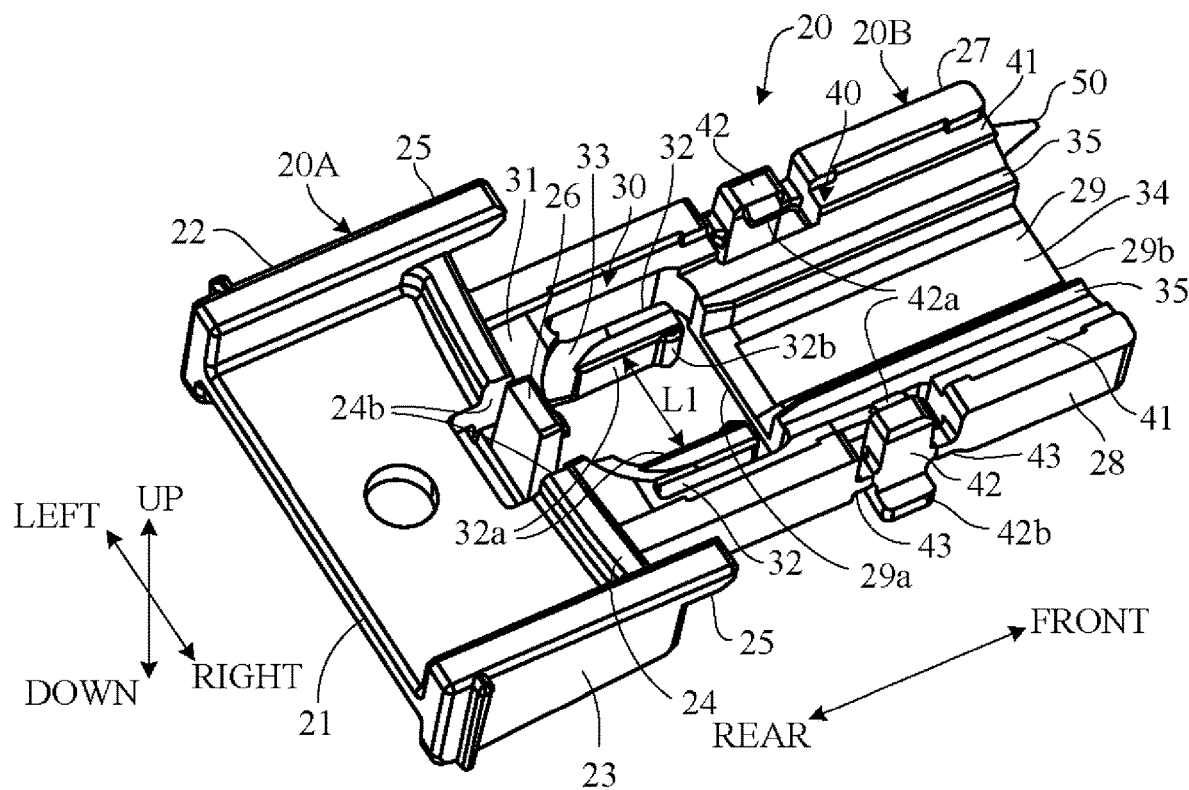
FIG. 10 is a perspective view of the cutting blade replacement jig according to the embodiment of the present invention seen obliquely from above.
Figure 11:
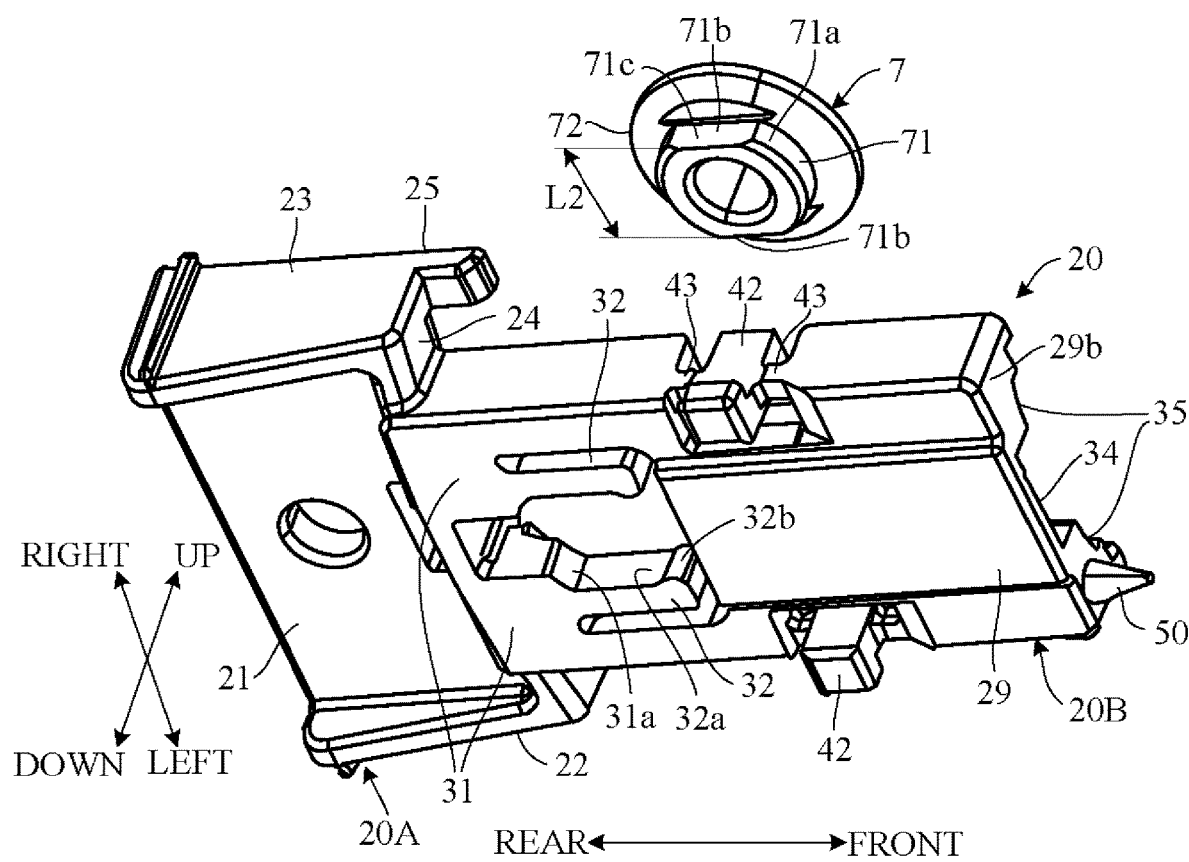
FIG. 11 is a perspective view of the cutting blade replacement jig according to the embodiment of the present invention seen obliquely from below.

FIG. 10 is a perspective view of a cutting blade replacement jig 20 according to an embodiment of the present invention seen obliquely from above, and FIG. 11 is a perspective view seen obliquely from below. FIG. 11 additionally shows the head 71 of a nut 7. For convenience of description in the following, configurations of the jig 20 are explained assuming the front-rear (longitudinal), left-right (lateral) and up-down (vertical) directions of the jig 20 to be as defined in the drawings. The jig 20 is made of resin material (e.g., polypropylene) and, with the exclusion its front end, has a symmetrical shape throughout in the left-right direction.

As shown in FIGS. 10 and 11, the jig 20 has an operating section 20A, and a retaining section 20B projecting forward from the operating section 20A. The operating section 20A has a substantially rectangular flat plate 21 extending in the longitudinal and lateral directions, a pair of lateral side plates 22 and 23 erected orthogonal to the flat plate 21 on opposite lateral edges of the flat plate 21, and a front plate 24 erected orthogonal to the flat plate 21 and the side plates 22 and 23 at the front end of the flat plate 21 and the front end of the side plates 22 and 23. A projection 25 is provided to protrude forward of the front plate 24 from the top of each of the side plates 22 and 23.

Figure 12A:
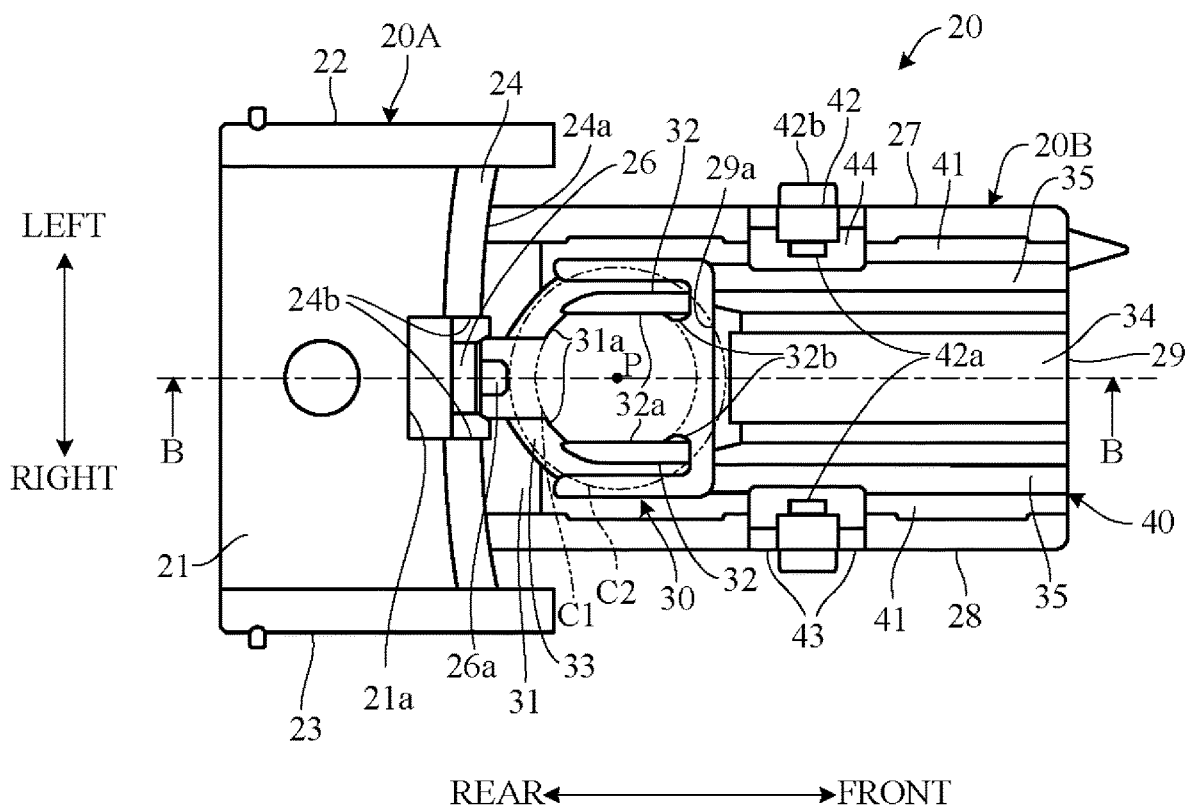
FIG. 12A is a plan view of the jig of FIGS. 10 and 11.
Figure 12B:
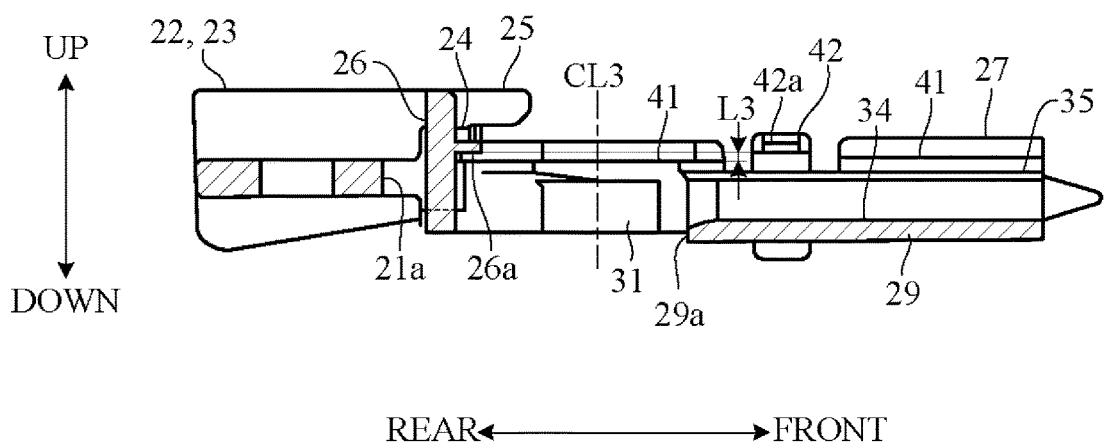
FIG. 12B is a cross-sectional view taken along line B-B of FIG. 12.

FIG. 12A is a plan view of the jig 20, and FIG. 12B is a cross-sectional view of the jig 20 cut along line B-B of FIG. 12A. As shown in FIGS. 12A and 12B, a front surface 24a of the front plate 24 is arcuately shaped to have approximately the same curvature as the outer peripheral surfaces 12a of the sloped portions 12 of the disk 1 (FIG. 6). A front end of the flat plate 21 is formed at a central region in the lateral direction with an angular U-shaped notch 21a that passes completely through the flat plate 21 vertically.

The front plate 24 is formed at a central region in the lateral direction with an orthogonally erected stopper 26 facing the notch 21a. Notches 24b are formed to a predetermined depth from an upper end surface of the front plate 24 on opposite lateral sides of the stopper 26, and the stopper 26 is supported on the front plate 24 at its bottom end to be swingable forward and rearward around the bottom end as a pivot. As shown in FIG. 12B, the stopper 26 projects above the front plate 24 to where its upper end surface is level with upper end surfaces of the side plates 22 and 23. A projection 26a protrudes forward from a front surface of the stopper 26.

As shown in FIGS. 10 and 11, the retaining section 20B has a pair of lateral side walls 27 and 28 extending forward from the front surface 24a of the front plate 24 and a bottom wall 29 interconnecting bottoms of the side walls 27 and 28. A nut holder 30 for holding a nut 7 is provided between the front surface 24a of the front plate 24 and a rear end surface 29a of the bottom wall 29. The nut holder 30 has a pair of left and right bases 31 projecting from the front surface 24a of the front plate 24 forward along inner side surfaces of rear ends of the side walls 27 and 28, and a pair of left and right pawls 32 projecting forward from forward ends of the bases 31 apart from and parallel to the side walls 27 and 28. At their front ends, the pawls 32 can expand and contract laterally.

The left and right pawls 32 face each other separated by a predetermined distance (length) L1 (FIG. 10) and each has an inner side surface 32a extending in the longitudinal direction. As seen in FIG. 12A, ends 31a of the bases 31 on the side of the inner side surfaces 32a are arcuately formed along an imaginary circle C1 centered on a point P a predetermined distance forward from the projection 26a of the stopper 26. Forward ends of the pawls 32 are provided with projections 32b that protrude laterally inward. The projections 32b are formed to have smoothly rounded protruding surfaces, and their rear end surfaces lie on the imaginary circle C1. A vertical axis (center line) CL3 that passes through the point P is shown in FIG. 12B.

As shown in FIG. 11, the head 71 of the nut 7 has a cylindrical portion 71a of approximately the same diameter as the imaginary circle C1 (FIG. 12A), and a cutaway portion 71c with a pair of parallel side surfaces 71b formed by cutting away parts of the circumference of the cylindrical portion 71a. Distance (length) L2 between the side surfaces 71b is roughly equal to distance L1 (FIG. 10) of the inner side surface 32a of the pawls 32. Therefore, the head 71 of the nut 7 can be fitted between the pawls 32 along the ends 31a of the bases 31, the inner side surfaces 32a of the pawls 32, and rear end surfaces of the projections 32b (see FIG. 12A).

As shown in FIG. 12A, top surfaces of the bases 31 and pawls 32 are formed from their forward ends throughout along the pawls 32 with recesses 33 within an imaginary circle C2 centered on the point P. Diameter of the imaginary circle C2 is approximately equal to diameter of the flange 72 of the nut 7, and the flange 72 fits into the recesses 33 and is placed on the top surfaces of the recesses 33. Depth of the recesses 33 is approximately equal to thickness of the flange 72, and the flange 72 can fit in the recesses 33 at an even level with the top surfaces of the bases 31.

As shown in FIG. 10, a groove 34 of predetermined depth is formed in the top surface of the bottom wall 29 from its front end surface 29b up to its rear end surface 29a, and guides 35 are formed on opposite lateral sides of the groove 34. Length of the groove 34 in the lateral direction is longer than length L2 of the head 71 of the nut 7 (FIG. 11) and depth of the groove 34 is deeper than height of the head 71 of the nut 7. Top surfaces of the guides 35 are located substantially on the same plane as the top surfaces of the recesses 33. As a result, the flange 72 can slide along the guides 35, so that the nut 7 can be moved forward from the groove 34 without interference between the head 71 of the nut 7 and the bottom wall 29.

A blade holder 40 for holding an associated one of the blades 2 is provided on the lateral side walls 27 and 28. The blade holder 40 has steps 41 provided on lateral inner faces of the side walls 27 and 28 to form a seat for the blade 2, and two lateral engaging pawls 42 provided on top surfaces of the steps 41 for engaging the blade 2. The blade holder 40 also includes the stopper 26 for restricting position of the blade 2 in the longitudinal direction. Length from the left end surface of the step 41 on the side wall 27 side to the right end surface of the step 41 on the side wall 28 side is about equal to width of the blade 2. The top surface of the steps 41 are located substantially on the same plane as the top surfaces of the bases 31 (excluding the recesses 33), and the blade 2 can be set in place across the top surfaces of the bases 31 and the top surfaces of the steps 41.

The engaging pawls 42 are provided at intermediate locations of the side walls 27 and 28. More exactly, as shown in FIGS. 10 and 11, the side walls 27 and 28 are provided forward of the nut holder 30 with forward and rearward thin portions 43 of thin vertical thickness and the engaging pawls 42 are supported on the side walls 27 and 28 at the thin portions 43. The engaging pawls 42 extend vertically and are formed on their laterally inward sides with vertical through-holes 44 that divide the steps 41 about midway. Protrusions 42a are provided to project laterally inward at top ends of the engaging pawls 42 and grips 42b are provided to project laterally outward at bottom ends thereof. The protrusions 42a can be swung laterally by a gripping force applied to and removed from the grips 42b, whereby distance between the opposing protrusions 42a can be expanded and contracted.

As seen in FIG. 12B, bottom surfaces of the protrusions 42a are arranged a predetermined distance (length) L3 above the top surfaces of the steps 41 and at same height as a bottom surface of the projection 26a of the stopper 26. The predetermined length L3 corresponds to thickness of the blade 2. The blade 2 is set in place on the top surfaces of the steps 41 by applying the gripping force to the grips 42b in order to expand width between protrusions 42a of the lateral engaging pawls 42 and then sliding the rear edge of the blade 2 underneath the projection 26a of the stopper 26. When the gripping force is thereafter removed, the distance between the protrusions 42a contracts, so that opposite lateral edges of the blade 2 are engaged by the protrusions 42a, whereby the rear edge of the blade 2 is engaged by the projection 26a of the stopper 26. In this condition, the blade 2 can be slid forward along the top surface of the steps 41.

As shown in FIGS. 10 and 11, a generally conical protuberance 50 is provided on a front end surface of the one side wall 27. The protuberance 50 can be used to remove dirt stuck in the socket 63 of the bolt 6, thereby facilitating removal and attachment of the bolt 6 for blade replacement after the lawn mowing work. Although not illustrated, the jig 20 can be placed inside the charging station 200 (FIG. 3) for storage through an openable cover provided on the charging station 200.

Now follows an explanation of a cutting blade replacement method according to an embodiment of the present invention. The case of attaching a new blade 2 to the disk 1 is explained in the following.

Figure 13A:
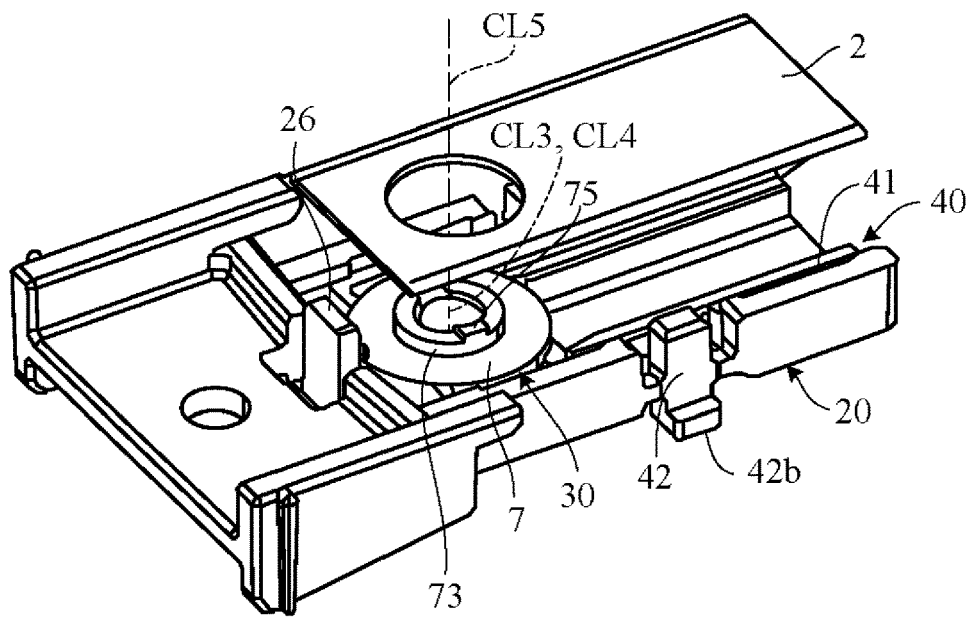
FIG. 13A is a diagram for explaining a jig preparation step in a cutting blade replacement method according to an embodiment of the present invention.

First, a jig 20 pre-loaded with a nut 7 and a blade 2 is prepared (jig preparation step). In this case, as shown in FIG. 13A, the nut 7 is fitted between the two pawls 32 of the nut holder 30 (FIG. 10), and the flange 72 of the nut 7 is placed on the top surface of the circular recesses 33 (FIG. 10). In this condition, the center line CL3 of the nut holder 30 and a center line CL4 of the nut 7 substantially coincide, and the nut 7 is positioned with its side surfaces 71b opposite the inner side surfaces 32a of the pawls 32. The two projections 75 at the end of the cylindrical portion 73 of the nut 7 are therefore positioned in the lateral direction of the jig 20.

Following this, the grips 42b of the engaging pawls 42 are gripped to expand the lateral protrusions 42a laterally, and the blade 2 is set in place on the steps 41 of the blade holder 40 while sliding the rear edge part of the blade 2 underneath the projection 26a of the stopper 26. In this condition, the center line CL3 of the nut holder 30, the center line CL4 of the nut 7, and a center line CL5 passing through the through-hole 2b of the blade 2 coincide.

Figure 13B:
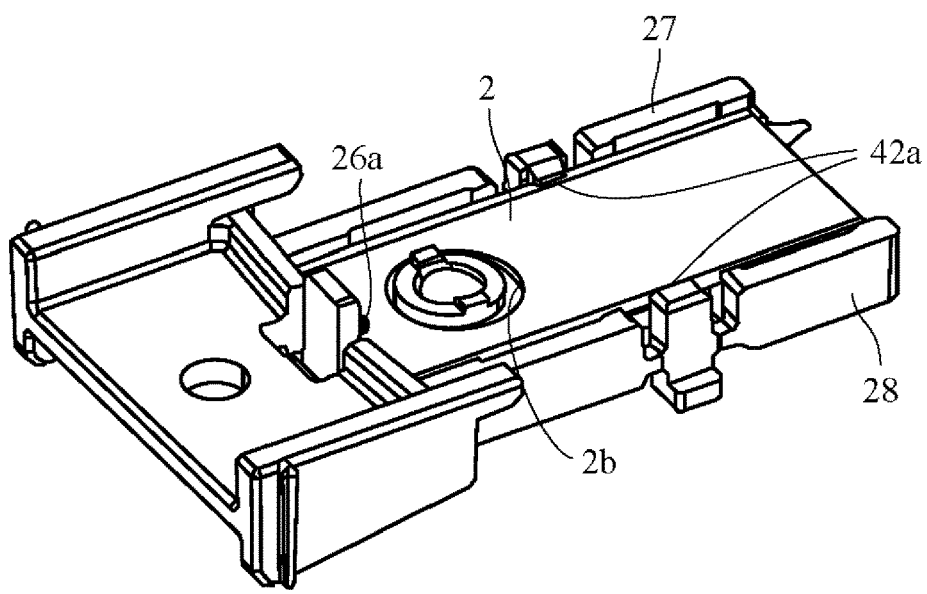
FIG. 13B is a diagram for explaining the jig preparation step following FIG. 13A.

Therefore, as shown in FIG. 13B, the flange 72 of the nut 7 is covered by the surface of the blade 2 surrounding the through-hole 2b, and the top surface of the blade 2 is locked by the protrusions 42a of the engaging pawls 42 and the projection 26a of the stopper 26. As a result, the nut 7 and blade 2 are integrally fastened together with the jig 20, and the blade edges 2a of the blade 2 are covered by the side walls 27 and 28 so as not to be exposed to the exterior. In this condition with nut 7 and blade 2 fixed to the jig 20, the center line CL5 passing through the through-hole 2b of the blade 2 and the center line CL4 of the nut 7 substantially coincide with the center line CL3 of the nut holder 30 of the jig (FIG. 12B).

Next, the jig 20 is attached to the peripheral edge of the disk 1 (jig attachment step). In this case, the lawn mower 100 is turned upside down or elevated, and the retaining section 20B is inserted into the associated one of the cutouts 10 of the disk 1 from radially outside in the direction of arrow A (radially inward direction), as shown FIG. 14A. More specifically, the retaining section 20B is inserted facing the top surface 10a of the disk 1 until the stopper 26 abuts the outer peripheral surface 12a of the sloped portion 12 so that the sloped portion 12 of the disk 1 is located in a gap between the pair of left and right projections 25 and the side walls 27 and 28. In other words, the jig 20 is disposed in the peripheral edge region of the disk 1 so that the center line CL2 of the through-hole 13 of the sloped portion 12 of the disk 1 (FIG. 8) and the center line CL5 of the through-hole 2b of the blade 2 coincide.

Figure 14A:
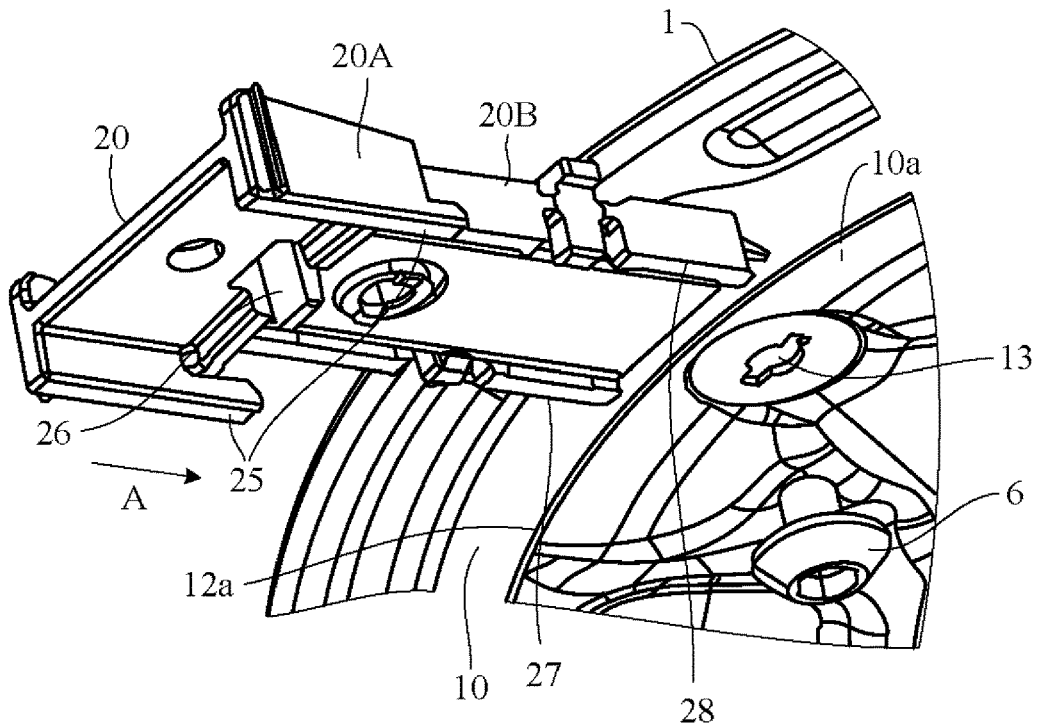
FIG. 14A a diagram for explaining a jig attachment step in the cutting blade replacement method according to the embodiment of the present invention.
Figure 14B:
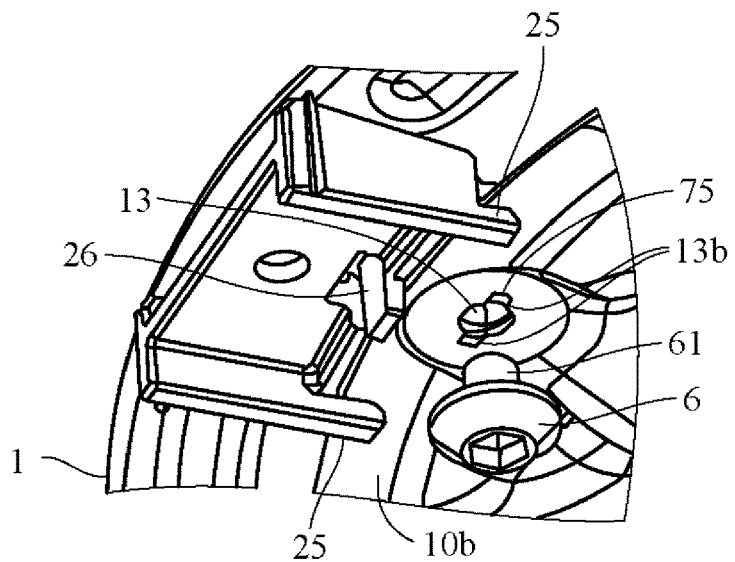
FIG. 14B is a diagram for explaining the jig attachment step following FIG. 14A.

Therefore, as shown in FIG. 14B, the projections 75 of the nut held in the jig 20 fit in the notches 13b of the through-hole 13 of the disk 1. As a result, the jig 20 can be attached to the disk 1 with the disk 1 vertically clamped between the left and right projections 25 and the projections 75 of the nut 7. Therefore, the jig 20 no longer needs to be held by hand once the projections 75 fit in the notches 13b. Whether the projections 75 are fitted in the notches 13b can be checked visually. Whether the projections 75 are fitted can also be ascertained from a metallic sound occurring when the projections 75 fit into the notches 13b.

Figure 15A:
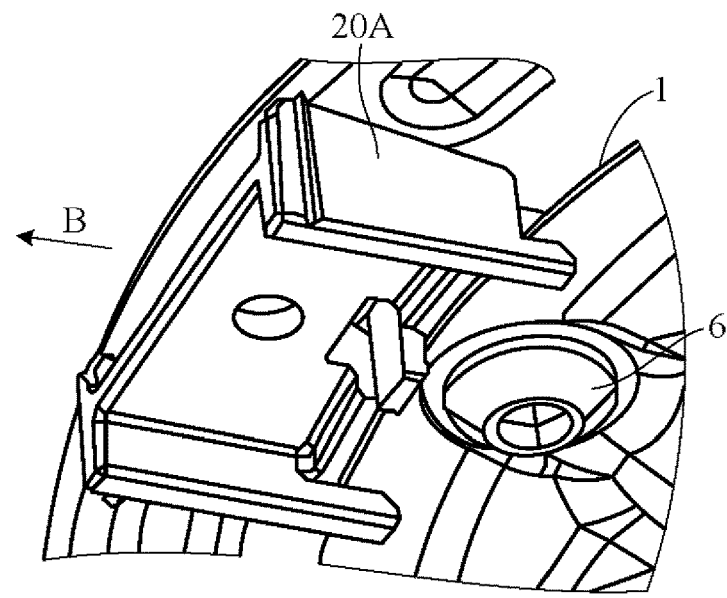
FIG. 15A is a diagram for explaining a bolt fastening step and a jig removal step in the cutting blade replacement method according to the embodiment of the present invention.

Next, the threaded portion 61 of a bolt 6 is inserted into the through-hole 13 from the bottom surface 10b side of the disk 1 and screwed into the nut 7 (bolt fastening step). As shown in FIG. 15A, this fastens the bolt 6 to the nut 7 and fixes the blade 2 to the disk 1. In the condition with the jig 20 attached to the disk 1, fastening of the bolt 6 is easy because the nut 7 is prevented from rotating owing to the projections 75 of the nut 7 being fitted into the through-hole 13 of the disk 1. Since the bottom surface 10b side of the disk 1 is openly exposed, a tool used to fasten the bolt is easy to maneuver.

Figure 15B:
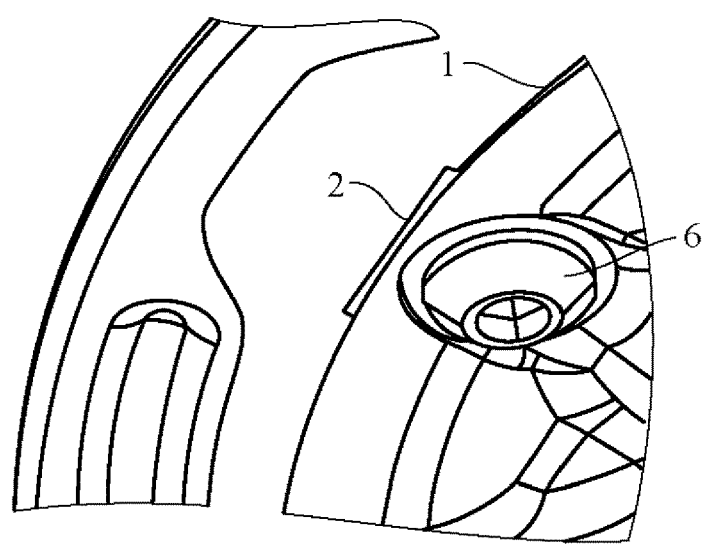
FIG. 15B is a diagram showing a state after the jig removal step in the cutting blade replacement method according to the embodiment of the present invention.

Next, the operating section 20A of the jig 20 is grasped and the jig 20 is pulled toward the radially outward side of the disk 1, i.e., in the direction of arrow B in FIG. 15A (jig removal step). The guides 35 of the jig 20 (FIG. 12A) therefore move (slide) along the flange 72 of the nut 7 as the steps 41 of the jig 20 (FIG. 12A) move (slide) along the blade 2. As a result, as shown in FIG. 15B, the jig 20 can be removed from the disk 1 while leaving the blade 2 attached to the disk 1. The foregoing steps complete the work of replacing (attaching) the blade 2. When the blade 2 is to be removed from the disk 1, the bolt 6 needs to be loosened. In this case, the work of loosening the bolt 6 and removing the blade 2 can be performed without using the jig 20 because the projections 75 engage the notches 13b and restrict the position of the nut 7 with respect to the disk 1.

As shown in FIG. 15B, when the jig 20 has been removed, the end of the blade 2 faces radially inward of the disk 1. When the disk 1 is rotated in this condition, the blade 2 rotates around the center line CL5 owing to centrifugal force to face radially outward, as shown in FIG. 4. As a result, the blade 2 projects radially outward from the disk 1, making lawn mowing work possible. In the present embodiment, the blades 2 are attached to the disk 1 through the cutouts 10 and the outer periphery of the disk 1 is located above the blades 2. Therefore, since the blades 2 are not fully exposed during lawn mowing work, i.e., the upside of the blades 2 are guarded by the disk 1, work safety can be considerably enhanced.

The present embodiments can achieve advantages and effects such as the following:

(1) The cutting blade replacement jig 20 of the utility unit according to the embodiment of the present invention is used to individually replace the blades 2 which are formed with the through-hole 2b for passing the bolt 6 and are attached to the peripheral edge of the disk 1 by the bolts 6 passed through the through-holes 13 formed in the peripheral edge of the disk 1 and the nuts 7 fastened to the bolt 6 (FIG. 8). This cutting blade replacement jig 20 includes the nut holder 30 that holds the nut 7 and the blade holder 40 that holds the blade 2 on the nut 7 (flange 72) held in the nut holder 30 in a state with the center line CL5 of the through-hole 2b and the center line CL4 of the nut 7 substantially aligned (FIGS. 10 and 11). The holding of the nut 7 and the blade 2 in the nut holder 30 and the blade holder 40, respectively, in this manner makes it possible to fasten the bolt 6 in the nut 7 via the through-hole 2b of the blade 2 while simultaneously restraining the nut 7 and the blade 2, whereby the work of replacing the blade 2 can be easily and efficiently performed.

(2) The nut holder 30 includes the recess 33 on which the nut 7 is mounted. The blade holder 40 includes the stopper 26 (projection 26a) and engaging pawls 42 (protrusions 42a) that engage with the blade 2 disposed on the nut 7 mounted in the recess 33 and that integrally hold the nut 7 and the blade 2 (FIGS. 10 and 11). Since the holding of the nut 7 and the blade 2 integrally in the jig 20 in this manner prevents detachment of the nut 7 and blade 2 from the jig 20, the jig 20 is easy to handle and the work of replacing the blade 2 is facilitated.

(3) The jig 20 includes the guides 35 and steps 41 that slidably support the nut 7 and the blade 2 so that the nut 7 and the blade 2 are integrally detached from the jig 20 (FIGS. 10 and 12A). Therefore, after the bolt 6 is fastened in the nut 7 integrally retained in the jig 20, the jig 20 can be easily removed.

(4) The jig 20 is equipped with the projections 25 capable of attaching the blade 2 to the peripheral edge of the disk 1, with the nut 7 and blade 7 still integrally held, so that the center line CL5 of the through-hole 2b of the blade 2 substantially coincides with the axis CL2 of the through-hole 13 of the disk (FIG. 14B). As a result, the jig 20 can be kept attached to the disk 1 without using the hands, so that the work of fastening the bolt 6 can be easily performed.

(5) The end of the nut 7 (projections 75) is fitted in the notches 13b of the disk 1, so that the nut 7 is mounted to be non-rotatable with respect to the disk 1, and the nut holder 30 includes the pawls 32 that restrict the position of the nut 7 in the circumferential direction (FIG. 10). Therefore, since the jig 20 can prevent rotation of the nut 7, the bolt 6 can be easily fastened.

(6) The cutting blade replacement method of the utility unit according to the embodiment of the present invention is a method for replacing the blade 2, formed with the through-hole 2b through which the bolt 6 passes and attached to the peripheral edge of the disk 1, using the bolt 6 passed through the through-hole 13 formed in the peripheral edge of the disk 1 and the nut 7 fastened to the bolt 6. In this method, the nut 7 and the blade 2 are in advance held in the jig 20 in a state with the center line CL3 of the nut 7 and the center line CL5 of the through-hole 2b of the blade 2 substantially aligned (FIGS. 13A and 13b), the jig 20 is disposed on the peripheral edge of the disk 1 with the center line CL5 of the through-hole 2b of the blade 2 and the axis CL2 of the through-hole 13 of the disk 1 substantially aligned (FIGS. 14A and 14B), and the bolt 6 is passed through the through-hole 13 formed at the peripheral edge of the disk 1 and the through-hole 2b of the blade 2, and is screwed into the nut 7 to fasten the blade 2 to the disk 1 (FIGS. 15A and 15B). According to this cutting blade replacement method, the jig 20 can be used to simultaneously arrange the nut 7 and the blade 2 at desired positions relative to the through-hole 13 of the disk 1. The blade 2 can therefore be efficiently attached to the disk 1 and the work of replacing the blade 2 is easy.

In the above embodiment, the function of a fastening member holder is configured so that the nut holder 30 for holding the nut 7 are provided in the jig 20. In other words, the bolt 6 that passes through the disk through-hole 13 and the nut 7 fastened to the bolt 6 are configured as a first fastening member and a second fastening member, respectively. Alternatively, the bolt can be held by a jig. In other words, the nut can be configured as the first fastening member and the bolt can be configured as the second fastening member, and the configuration of the fastening member holder is not limited to the above configuration.

In the above embodiment, the blade 2 is held on the flange 72 of the nut 7 by the blade holder 40 in a state with the center line CL5 of the through-hole 2b of the blade 2 (cutting blade through hole) substantially aligned with the center line CL4 of the nut 7, but the configuration of the cutting blade holder is not limited to this. Although in the above embodiment, the flange 72 of the nut 7 is mounted on the top surface of the recess 33 of the jig 20, the configuration of a mounted portion is not limited to this. In the above embodiment, the nut 7 and the blade 2 are held integrally in the jig 20 by the stopper 26 and two engaging pawls 42 of the jig 20, more exactly by the projection 26a of the stopper 26 (first cutting blade engaging portion) that restricts longitudinal direction (front-rear direction) movement of the blade 2 and the protrusions 42a of the engaging pawls 42 (second cutting blade engaging portion) that restrict lateral direction (left-right direction) position of the blade 2, However, the configuration of a cutting blade engaging portions is not limited to this. Although in the above embodiment, the blade 2 is formed in a substantially rectangular flat plate-like shape and opposite sides of the blade 2 are provided with blade edges 2a, the configuration of a cutting blade is not limited to this.

Although in the above embodiment, the nut 7 and the blade 2 are configured to detach integrally from the jig 20 utilizing the guides 35 and steps 41 that slidably support the nut 7 and the blade 2, the configuration of the sliding support is not limited to this. In the above embodiment, the jig 20 is attached to the peripheral edge part of the disk 1 via the projections 25 so the center line CL5 of the through-hole 2b of the blade 2 substantially aligns with the center line CL3 of the disk through-hole 13, the configuration of a jig attachment portion is not limited to this. In the above embodiment, the position of the nut 7 in the circumferential direction is restricted by means of the projections 75 at the end of the nut 7 fitted in the notches 13b of the through-hole 13 of the disk 1, but the configuration of a position restricting portion is not limited to this.

In the above, the cutting blade replacement jig 20 is used when replacing a blade 2 of the lawn mower 100 capable of autonomous navigation. However, a cutting blade replacement jig of the present invention can be similarly used in the case of replacing a cutting blade of some other kind of utility unit. For example, the jig of the present invention can be similarly used in the case of changing a cutting blade attached to a hand-pushed lawn mower, a hand-held lawn mower, or other type of lawn mower, or a utility unit other than a lawn mower (e.g., a brush cutter or the like).

The above embodiment can be combined as desired with one or more of the aforesaid modifications. The modifications can also be combined with one another.

According to the present invention, a second fastening member is fastened to a first fastening member, while the second fastening member and a cutting blade are integrally held. Therefore, a work of replacing the cutting blade can be easily and efficiently performed.

Above, while the present invention has been described with reference to the preferred embodiments thereof, it will be understood, by those skilled in the art, that various changes and modifications may be made thereto without departing from the scope of the appended claims.

What is claimed is:

1. A cutting blade replacement jig for replacing a cutting blade of a utility unit, the cutting blade being attached to a peripheral edge part of a disk by a first fastening member and a separate second fastening member fastened to the first fastening member, the first fastening member passing through a disk through-hole formed in the peripheral edge part of the disk and a cutting blade through-hole formed in the cutting blade,
   the cutting blade replacement jig configured to hold the second fastening member and the cutting blade integrally together prior to fastening of the first fastening member to the second fastening member, the cutting blade replacement jig comprising:
      a fastening member holder configured to hold the second fastening member; and
      a cutting blade holder configured to hold the cutting blade on the second fastening member held in the fastening member holder in a state where a center line of the cutting blade through-hole and a center line of the second fastening member are aligned prior to an insertion of the first fastening member through the cutting blade through-hole;
   the cutting blade replacement jig further comprising a jig attaching portion configured to attach the cutting blade replacement jig to the peripheral edge part of the disk in a state where the second fastening member and the cutting blade are integrally held, so that the center line of the cutting blade through-hole and a center line of the disk through-hole align; and
   the cutting blade replacement jig further comprising a sliding support configured to integrally detach the second fastening member from the fastening member holder and the cutting blade from the cutting blade holder when the cutting blade replacement jig is removed from the disk after fastening of the first fastening member to the second fastening member.

2. The cutting blade replacement jig according to claim 1, wherein the fastening member holder includes a mounted portion on which the second fastening member is mounted, and
   the cutting blade holder includes a cutting blade engaging portion configured to engage with the cutting blade disposed on the second fastening member mounted on the mounted portion to integrally hold the second fastening member and the cutting blade.

3. The cutting blade replacement jig according to claim 2, wherein the cutting blade is formed in a rectangular flat plate shape, and
   the cutting blade engaging portion includes a first cutting blade engaging portion engaging with an end of the cutting blade in a longitudinal direction to restrict a movement of the cutting blade in the longitudinal direction and a second cutting blade engaging portion engaging with both ends of the cutting blade in a lateral direction to restrict a movement of the cutting blade in the lateral direction.

4. The cutting blade replacement jig according to claim 3, wherein the second cutting blade engaging portion is configured to be swingable in the lateral direction of the cutting blade.

5. The cutting blade replacement jig according to claim 2, further comprising a side wall covering a blade edge of the cutting blade held by the cutting blade engaging portion.

6. The cutting blade replacement jig according to claim 1, wherein the second fastening member is non-rotatably engaged with the disk through-hole, and the fastening member holder includes a position restricting portion restricting a position of the second fastening member in a circumferential direction.

7. The cutting blade replacement jig according to claim 6, wherein an end portion of the second fastening member includes a projection fitting non-rotatably into a notch formed in the disk.

8. A cutting blade replacement method for replacing a cutting blade of a utility unit, the cutting blade being attached to a peripheral edge part of a disk by a first fastening member and a separate second fastening member fastened to the first fastening member, the first fastening member passing through a disk through-hole formed in the peripheral edge part of the disk and a cutting blade through-hole formed in the cutting blade, the cutting blade replacement method comprising:
providing a cutting blade replacement jig comprising a fastening member holder configured to hold the second fastening member, and a cutting blade holder configured to hold the cutting blade on the second fastening member;
holding the second fastening member and the cutting blade in the cutting blade replacement jig integrally together prior to fastening of the first fastening member to the second fastening member, and in a state of aligning a center line of the second fastening member and a center line of the cutting blade through-hole;
attaching the cutting blade replacement jig at the peripheral edge part of the disk in a state where the second fastening member and the cutting blade are integrally held prior to an insertion of the first fastening member through the cutting blade through-hole, so that the center line of the cutting blade through-hole aligns with a center line of the disk through-hole using a jig attaching portion fo the cutting blade replacement jig;
attaching the cutting blade to the disk by inserting the first fastening member through the cutting blade through-hole of the cutting blade and the disk through-hole, and by fastening the first fastening member to the second fastening member; and
removing the cutting blade replacement jig from the disk using a sliding support of the cutting blade replacement jig to integrally detach the second fastening member from the fastening member holder and the cutting blade from the cutting blade holder when the cutting blade replacement jig is removed from the disk after fastening of the first fastening member to the second fastening member.

9. The cutting blade replacement method according to claim 8, wherein removing the cutting blade replacement jig comprises:
pulling the cutting blade replacement jig radially outward from the disk by sliding the cutting blade replacement jig relative to the second fastening member and the cutting blade.

10. The cutting blade replacement method according to claim 8, wherein attaching the cutting blade replacement jig at the peripheral edge part of the disk comprises:
non-rotatably fitting the second fastening member into a notch formed in the disk.

11. A cutting blade replacement jig configured to replace a cutting blade of a utility unit, wherein the cutting blade is attached to a rotating disk of the utility unit with a nut and a bolt, the cutting blade replacement jig comprising:

an operating section; and
a retaining section projecting forward from the operating section;
the retaining section configured to integrally hold the nut and the cutting blade prior to fastening of the bolt to the nut, and including:
a nut holder configured to hold the nut; and
a blade holder configured to hold the cutting blade on the nut with a center line of a cutting blade through-hole aligned with a center line of the nut prior to an insertion of the bolt through the cutting blade through-hole;
the operating section comprising a jig attaching portion configured to attach the cutting blade replacement jig to a peripheral edge part of the disk so that the center line of the cutting blade through-hole and a center line of a disk through-hole of the disk coincide;
the retaining section comprising a sliding support configured to integrally detach the nut from the nut holder and the cutting blade from the blade holder when the cutting blade replacement jig is removed from the disk after fastening of the bolt to the nut.

12. The cutting blade replacement jig of claim 11 wherein:
the operating section comprises:
a flat plate extending in longitudinal and lateral directions;
a pair of lateral side plates orthogonal to the flat plate on opposite lateral edges of the flat plate;
a front plate orthogonal to the flat plate and the side plates at a front end of the flat plate and a front end of the side plates; and
projections that protrude forward of the front plate from a top of the side plates.

13. The cutting blade replacement jig of claim 12 wherein:
a front surface of the front plate is arcuately shaped to a curvature of an outer peripheral surface of the disk.

14. The cutting blade replacement jig of claim 12 wherein:
the retaining section comprises:
a pair of lateral side walls extending forward from the front plate; and
a bottom wall interconnecting bottoms of the side walls;
wherein the nut holder is provided between a front surface of the front plate and a rear end surface of the bottom wall.

15. The cutting blade replacement jig of claim 14 wherein:
the nut holder includes a recess having a diameter equal to a diameter of a flange of the nut.

16. The cutting blade replacement jig of claim 14 wherein:
the nut holder includes:
a pair of left and right bases projecting from the front surface of the front plate forward along inner side surfaces of rear ends of the side walls; and
a pair of left and right pawls projecting forward from forward ends of the left and right bases apart from and parallel to the side walls, and configured to expand and contract laterally.

17. The cutting blade replacement jig of claim 14 wherein:
the blade holder includes:
steps provided on lateral inner faces of the side walls that form a seat for the cutting blade;
lateral engaging pawls provided on top surfaces of the steps that engage the cutting blade; and a stopper at the front plate that restricts a position of the cutting blade in the longitudinal direction.

18. The cutting blade replacement jig of claim 17 wherein:
the lateral engaging pawls are disposed at intermediate locations of the side walls, and are forward of the nut holder.

19. The cutting blade replacement jig of claim 17 wherein:
the stopper projects above the front plate, and includes a projection that protrudes forward from a front surface of the stopper.

20. The cutting blade replacement jig of claim 17 wherein:
the side walls cover blade edges of the cutting blade held by the blade holder.

\* \* \* \* \*